United States Patent
Wilson et al.

(10) Patent No.: US 8,810,983 B2
(45) Date of Patent: Aug. 19, 2014

(54) POWER DISCONNECT SYSTEM AND METHOD

(75) Inventors: Glenn Wilson, Endicott, NY (US); Daniel Buchanan, Vestel, NY (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 466 days.

(21) Appl. No.: 12/631,554

(22) Filed: Dec. 4, 2009

(65) Prior Publication Data

US 2010/0254053 A1    Oct. 7, 2010

Related U.S. Application Data

(60) Provisional application No. 61/165,744, filed on Apr. 1, 2009.

(51) Int. Cl.
*H02H 3/00* (2006.01)
*H02H 5/00* (2006.01)

(52) U.S. Cl.
CPC .................................. *H02H 3/00* (2013.01)
USPC ................ 361/59; 361/61; 361/71; 361/75

(58) Field of Classification Search
USPC .......................................................... 361/42
See application file for complete search history.

(56) References Cited

U.S. PATENT DOCUMENTS

| | | |
|---|---|---|
| 3,949,366 A | 4/1976 | Spillar et al. |
| 3,973,171 A | 8/1976 | Howell |
| 3,999,103 A | 12/1976 | Misencik et al. |
| 4,081,852 A | 3/1978 | Coley et al. |
| 4,115,192 A | 9/1978 | Jogand |
| 4,150,441 A | 4/1979 | Ando |
| 4,164,771 A | 8/1979 | Heinrich |
| 4,263,637 A | 4/1981 | Draper et al. |
| 4,309,681 A | 1/1982 | Draper et al. |
| 4,363,063 A | 12/1982 | Erickson |
| 4,484,243 A | 11/1984 | Herbst et al. |
| 4,598,331 A | 7/1986 | Legatti |
| 4,625,189 A * | 11/1986 | Lazar et al. ...................... 335/10 |
| 4,996,646 A * | 2/1991 | Farrington .................... 700/293 |
| 5,319,514 A * | 6/1994 | Walsh et al. .................... 361/59 |
| 5,638,948 A | 6/1997 | Sharaf et al. |
| 5,889,643 A | 3/1999 | Elms |
| 5,920,451 A | 7/1999 | Fasano et al. |
| 6,011,398 A | 1/2000 | Bald et al. |
| 6,014,297 A | 1/2000 | Clarey et al. |
| 6,031,335 A | 2/2000 | Lawrence |
| 6,100,777 A | 8/2000 | Mueller et al. |

(Continued)

*Primary Examiner* — Dharti Patel
(74) *Attorney, Agent, or Firm* — McDonnell Boehnen Hulbert & Berghoff LLP (57) ABSTRACT

A system for protecting a load from a fault on a line comprising: a detection circuit monitoring the line; and a switch interposed between the line and the load; wherein the detection circuit triggers the switch to disconnect the load from the line when the fault is detected. The detection circuit may trigger the switch within one second of detecting the fault. The detection circuit may monitor the line voltage of the line and the fault may be detected when the line voltage exceeds 125% or 130% of the normal voltage. The load may be automatically reconnected to the line when the line voltage drops to within 5% or 10% of a normal voltage. The fault may be any one or more of an open-neutral, an over-voltage, an under-voltage, a phase loss, and an external trigger, such as an access sensor, a smoke sensor, and/or a heat sensor.

20 Claims, 13 Drawing Sheets

(56) References Cited

U.S. PATENT DOCUMENTS

| | | | |
|---|---|---|---|
| 6,122,155 A | 9/2000 | Aromin et al. | |
| 6,246,558 B1 | 6/2001 | DiSalvo et al. | |
| 6,266,260 B1 | 7/2001 | Zahrte, Sr. et al. | |
| 6,288,882 B1 | 9/2001 | DiSalvo et al. | |
| 6,292,337 B1 | 9/2001 | Legatti et al. | |
| 6,381,113 B1 | 4/2002 | Legatti | |
| 6,437,953 B2 | 8/2002 | DiSalvo et al. | |
| 6,552,885 B1 | 4/2003 | Campbell et al. | |
| 6,671,150 B2 | 12/2003 | Elms et al. | |
| 6,697,237 B2 | 2/2004 | Duve | |
| 6,717,782 B2 | 4/2004 | DiSalvo et al. | |
| 6,804,093 B2 | 10/2004 | Buie, Jr. | |
| 6,813,126 B2 | 11/2004 | DiSalvo et al. | |
| 6,864,766 B2 | 3/2005 | DiSalvo et al. | |
| 6,937,452 B2 | 8/2005 | Chan et al. | |
| 7,049,910 B2 | 5/2006 | Campolo et al. | |
| 7,133,266 B1 | 11/2006 | Finlay | |
| 7,149,066 B2 | 12/2006 | Elms et al. | |
| 7,161,780 B2 | 1/2007 | Germain et al. | |
| 7,196,886 B2 | 3/2007 | Chan et al. | |
| 7,239,491 B1 | 7/2007 | Morgan et al. | |
| 7,283,340 B1 | 10/2007 | Finlay, Sr. et al. | |
| 7,292,418 B2 * | 11/2007 | Egner | 361/42 |
| 7,292,419 B1 | 11/2007 | Nemir | |
| 7,359,167 B2 | 4/2008 | Elms | |
| 7,378,927 B2 | 5/2008 | DiSalvo et al. | |
| 7,400,477 B2 | 7/2008 | Campolo et al. | |
| 7,463,124 B2 | 12/2008 | DiSalvo et al. | |
| 7,518,840 B2 | 4/2009 | Elms | |
| 7,545,244 B2 | 6/2009 | DiSalvo et al. | |
| 7,558,033 B2 | 7/2009 | Zhou et al. | |
| 7,619,860 B1 | 11/2009 | Finlay, Sr. et al. | |
| 2004/0141265 A1 * | 7/2004 | Angle et al. | 361/44 |

\* cited by examiner

TLP Verification Test 1
Trip Levels @ Temperature

FIG. 3

1) Put TLP in a Temerature Chamber
2) Adjust Chamber Temperature to -25C
3) Increase V1 from 0 to 240VAC

|  | Min | Max | Units |
|---|---|---|---|
| 4) Verify V2 | 230 | 250 | VAC |

5) Wait 30 minutes

| 6) Verify V2 | 230 | 250 | VAC |
|---|---|---|---|

7) Increase V1 slowly until V2 < 20 VAC

| 8) Verify V1 | 310 | 330 | VAC |
|---|---|---|---|

9) Decrease V1 slowly until V2 > 200VAC

| 10) Verify V1 | 265 | 285 | VAC |
|---|---|---|---|

11) Adjust Chamber Temperature to +70C
12) Wait 30 minutes

| 13) Verify V2 | 230 | 250 | VAC |
|---|---|---|---|

14) Increase V1 slowly until V2 < 20 VAC

| 15) Verify V1 | 310 | 330 | VAC |
|---|---|---|---|

16) Decrease V1 slowly until V2 > 200VAC

| 17) Verify V1 | 265 | 285 | VAC |
|---|---|---|---|

18) Turn off Power and allow TLP to return to room Temperature

TLP Verification Test 2
1200 VAC Operation

1) Adjust V1 to 24VAC

|  | Min | Max | Units |
|---|---|---|---|
| 2) Verify A1 | 0.5 | 3 | AAC |

3) Quickly adjust V1 to 120 VAC
4) Wait 30 seconds

|  | Min | Max | Units |
|---|---|---|---|
| 5) Verify A1 | 0 | 0.2 | AAC |

6) Wait 1 Hour

| 7) Verify A1 | 0 | 0.2 | AAC |

8) Decrease V1 to 24 VAC

| 9) Verify A1 | 0.5 | 3 | AAC |

FIG. 4

TLP Verification Test 3
TRIP TIME

1) Open switch S1
2) Adjust V1 to 240VAC
3) Adjust V2 to 480VAC

|  | MIN | MAX | UNITS |
|---|---|---|---|
| 4) Verify V3 | 230 | 250 | VAC |
| 4) Close switch S1 while starting timer |  |  |  |
| 5) Measure time until V3 drops less than 20VAC | 0 | 1 | Seconds |
| 6) Reset timer |  |  |  |
| 7) Open switch S1 while starting timer |  |  |  |
| 8) Measure time until V3 increases to more than 400VAC | 0 | 10 | Seconds |

FIG. 5

TLP Verification Test 4
OPERATION UNDER CURRENT

1) Verify S1 is open

|  | MIN | MAX | UNITS |
|---|---|---|---|
| 2) Apply V1 | 220 | 260 | VAC |
| 3) Apply V2 | 460 | 500 | VAC |
| 4) Verify A1 | 70 | 90 | AAC |

5) Activate S1
6) Wait 30 seconds
7) Verify A1    0    5    AAC
8) Deactivate S1
9) Wait 30 seconds

REPEAT 5 TIMES

FIG. 6

TLP Verification Test 5
HI-POT

1) Adjust Hi-Pot to 5,000 VAC 60Hz 0.5 Sec ramp 3mA trip
2) Apply voltage for 120 seconds
3) Verify Hi-Pot didn't trip off during testing            PASS/FAIL

POWER DISCONNECT SYSTEM AND METHOD

CROSS REFERENCE TO RELATED APPLICATIONS

This application claims priority of U.S. Provisional Patent Application No. 61/165,744, filed Apr. 1, 2009, which is incorporated herein by specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention. The inventions disclosed and taught herein relate generally to power systems, devices, and methods; and more specifically relate to systems, devices, and methods for dealing with fault conditions.

DESCRIPTION OF THE RELATED ART

Many current surge suppression devices are designed to handle relatively short duration voltage and/or current surges.

The inventions disclosed and taught herein are directed to an improved system, device, and method for dealing with fault conditions.

BRIEF SUMMARY OF THE INVENTION

The present invention comprises a system for protecting a load from a fault related to a plurality of lines, the system comprising: a detection circuit monitoring a first line and a second line; and a switch interposed between the lines and the load; wherein the detection circuit triggers the switch to disconnect the load from the lines when the fault is detected. The detection circuit may automatically cause the switch to reconnect the load to the lines once the fault has cleared. The detection circuit may trigger the switch within one second of detecting the fault. The detection circuit may monitor a line voltage of the line, wherein the line voltage is normally approximately 240 volts AC, and the fault may be detected when the line voltage reaches approximately 300 volts AC. The detection circuit may monitor the line voltages of the lines and the fault may be detected when the line voltage exceeds 125% or 130% of the normal voltage. The system may be capable of withstanding approximately 1200 volts AC for at least one hour. The system may normally be exposed to approximately 240 volts AC at up to approximately 200 amps AC or approximately 480 volts AC at up to approximately 500 amps AC. The load may be automatically reconnected to the lines when the line voltages drops to approximately 250 volts AC. The load may be automatically reconnected to the lines when the line voltages drops to within 5% or 10% of a normal voltage. The fault may be any one or more of an open neutral, an over-voltage, an under-voltage, a phase loss, and/or an external trigger, such as an access sensor, a smoke sensor, and/or a heat sensor.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

Applicants have created a system for protecting a load from a fault related to a plurality of lines, the system comprising: a detection circuit monitoring a first line and a second line; and a switch interposed between the lines and the load;

wherein the detection circuit triggers the switch to disconnect the load from the lines when the fault is detected. The detection circuit may automatically cause the switch to reconnect the load to the lines once the fault has cleared. The detection circuit may trigger the switch within one second of detecting the fault. The detection circuit may monitor a line voltage of the line, wherein the line voltage is normally approximately 240 volts AC, and the fault may be detected when the line voltage reaches approximately 300 volts AC. The detection circuit may monitor the line voltages of the lines and the fault may be detected when the line voltage exceeds 125% or 130% of the normal voltage. The system may be capable of withstanding approximately 1200 volts AC for at least one hour. The system may normally be exposed to approximately 240 volts AC at up to approximately 200 amps AC or approximately 480 volts AC at up to approximately 500 amps AC. The load may be automatically reconnected to the lines when the line voltages drops to approximately 250 volts AC. The load may be automatically reconnected to the lines when the line voltages drops to within 5% or 10% of a normal voltage. The fault may be any one or more of an open neutral, an over-voltage, an under-voltage, a phase loss, and/or an external trigger, such as an access sensor, a smoke sensor, and/or a heat sensor.

Figure 1:
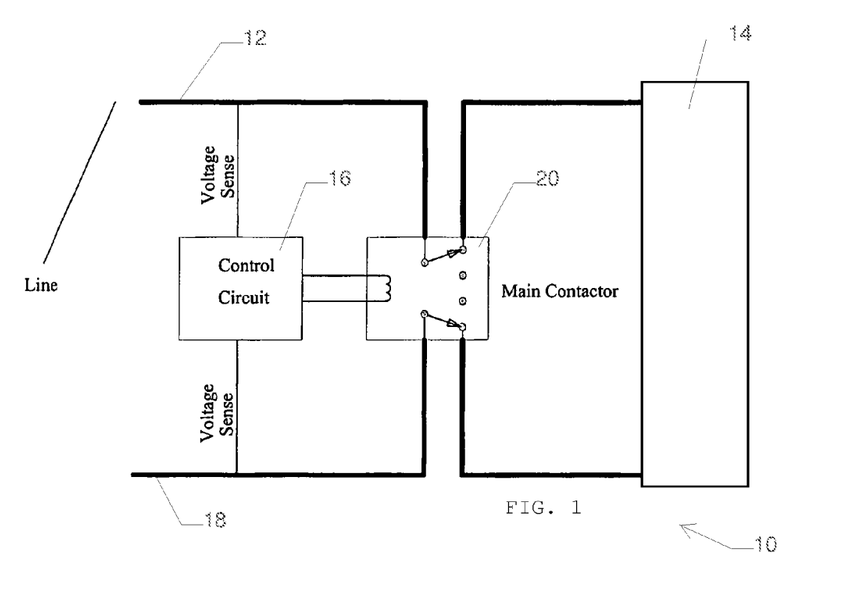
FIG. 1 illustrates a simplified block diagram a particular embodiment of a power disconnect system utilizing certain aspects of the present inventions.

FIG. 1 is an illustration of a particular embodiment of a power disconnect system 10 of the present invention. The system may be installed between an incoming power source or line 12, such as a 120/240 VAC residential service line, and a load 14, such as a residential meter, a circuit breaker panel, internal household loads, and/or a surge protector. The system 10 may be capable of disconnecting the load 14 from the line 12, in an effort to isolate the load 14 from any fault condition the line 12 is exposed to. The system 10 may also be capable of automatically reconnecting the load 14 to the line 12, once the fault has been cleared.

In one embodiment, the system 10 is particularly useful where residential power is provided with lines 12 in close proximity to utility power distribution and/or transmission lines. In one example, the system 10 may be used where the 120/240 VAC residential service line 12 is mounted on the same poles or structures as 12 k VAC utility power distribution lines and 60 k VAC utility power transmission lines. In this example, should the distribution line fault to the residential service line, or the transmission line fault to either the distribution line or the residential service line, the residential service line would see a fault voltage. Upon detecting the fault voltage, in one embodiment, the system 10 of the present invention immediately disconnects the load 14 from the line 12, and continues to monitor the line voltage. If and/or when the line voltage comes back down to near the normal operating voltage, the system 10 automatically reconnects the load 14 to the line 12.

More specifically, the system 10 may include a detection, or detector, circuit 16 which may be wired across the line 12 to a neutral or ground 18, or from line 12a to line 12b. The system 12 may also include a breaker, contactor, disconnect, or other switch 20 wired between the line 12 and the load 14, and operable to disconnect the load 14 from the line 12, when the detection circuit 16 detects the fault and triggers the switch 20. The detection circuit 16, or another portion of the system 10, may also be configured to reset the switch 20, or otherwise reconnect the load 14 to the line 12, when the fault has been corrected, cleared, or has otherwise passed.

FIG. 2A, FIG. 2B, FIG. 2C, and FIG. 2D show an exemplary detection circuit 16 and switch 20. As discussed above, and as shown in FIG. 2A, the detection circuit 16 may monitor one or more line voltages between the line 12 and the ground or neutral 18. Alternatively, the detection circuit 16 may monitor one or more line voltages between a first line 12a and a second line 12b. In still other alternatives, the detection circuit 16 may monitor multiple line voltages between a first line 12a and the ground or neutral 18 and a second line 12b and the ground or neutral 18.

Figure 2A:
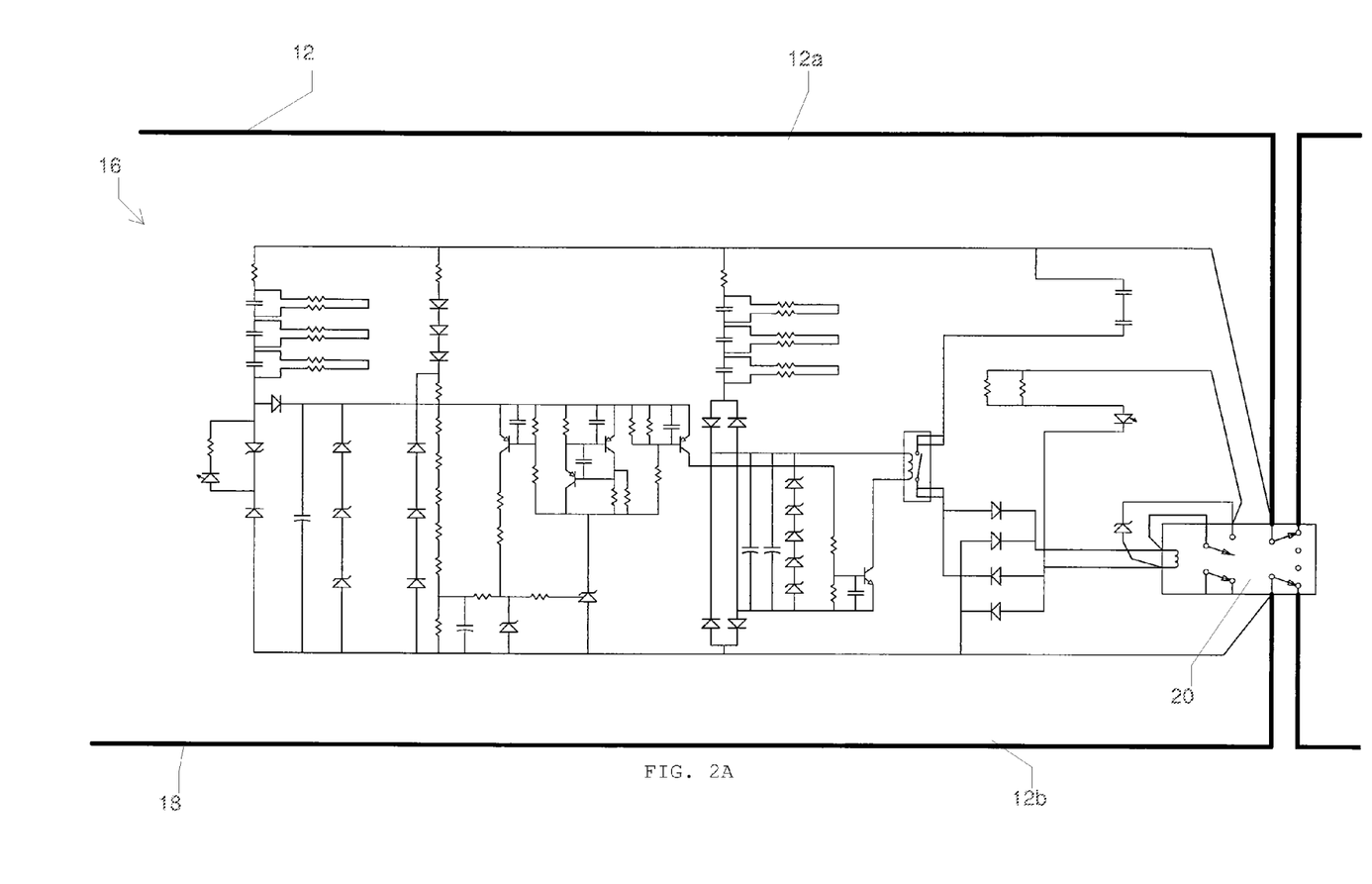
FIG. 2A illustrates a schematic of a particular embodiment of a power disconnect circuit utilizing certain aspects of the present inventions.
Figure 2B:
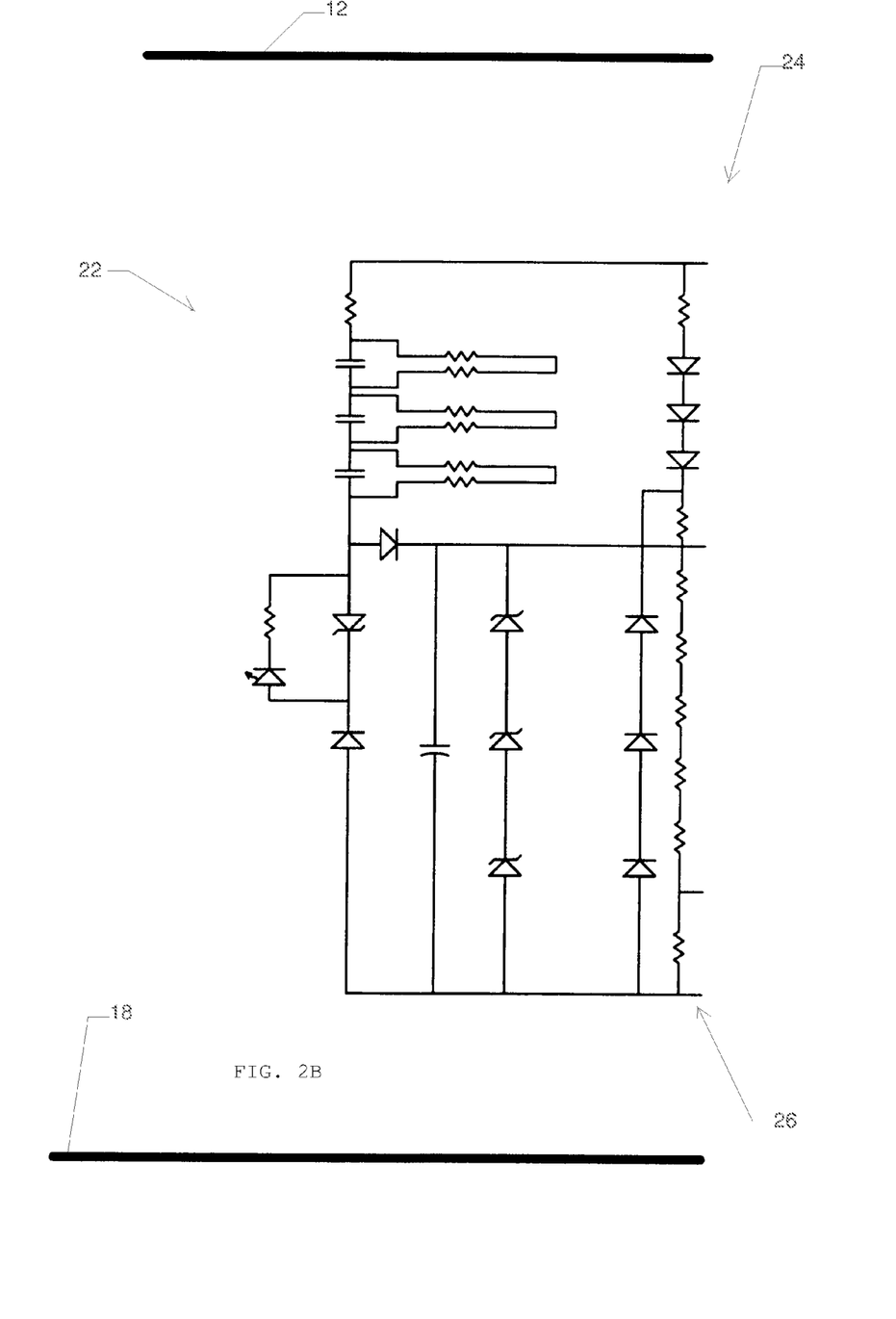
FIG. 2B illustrates a first partial close-up schematic of the power disconnect circuit of FIG. 2A.
Figure 2C:
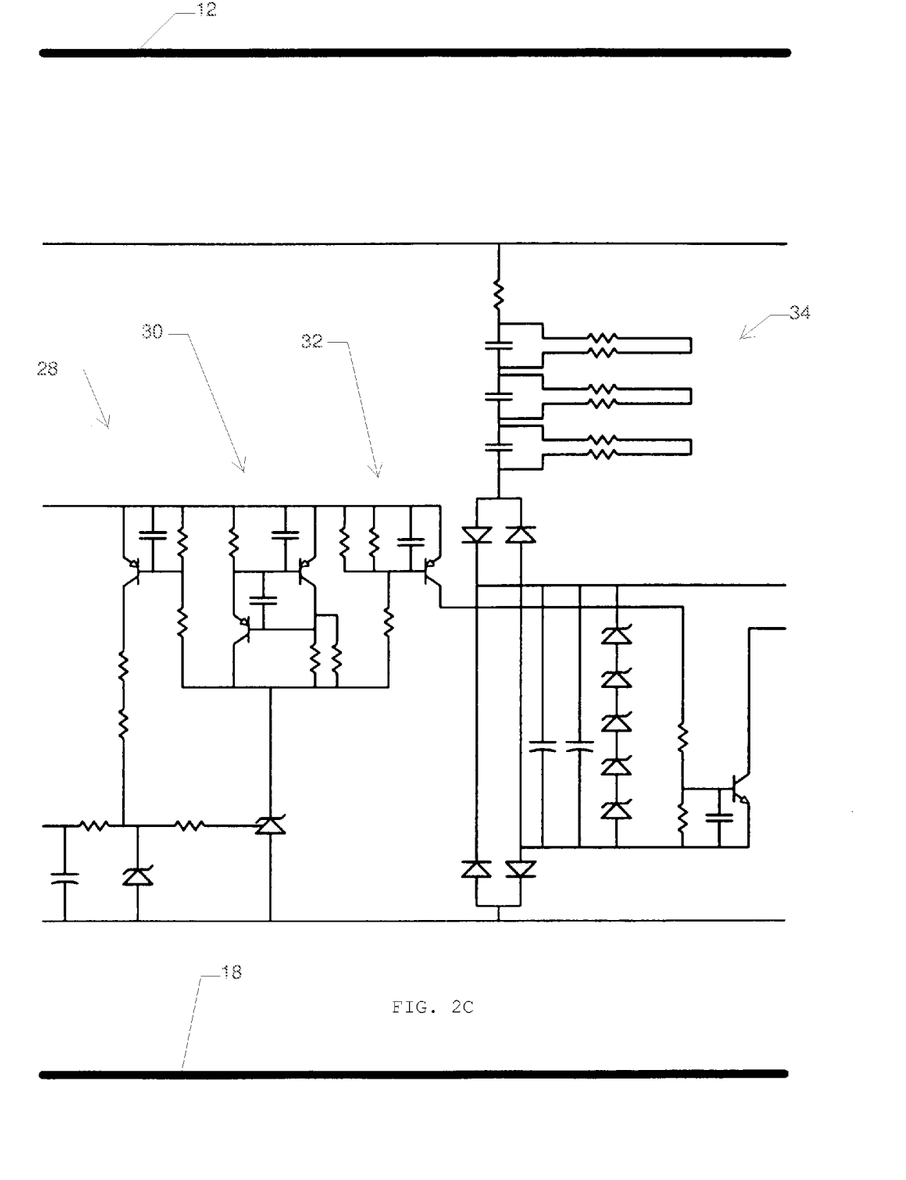
FIG. 2C illustrates a second partial close-up schematic of the power disconnect circuit of FIG. 2A.
Figure 2D:
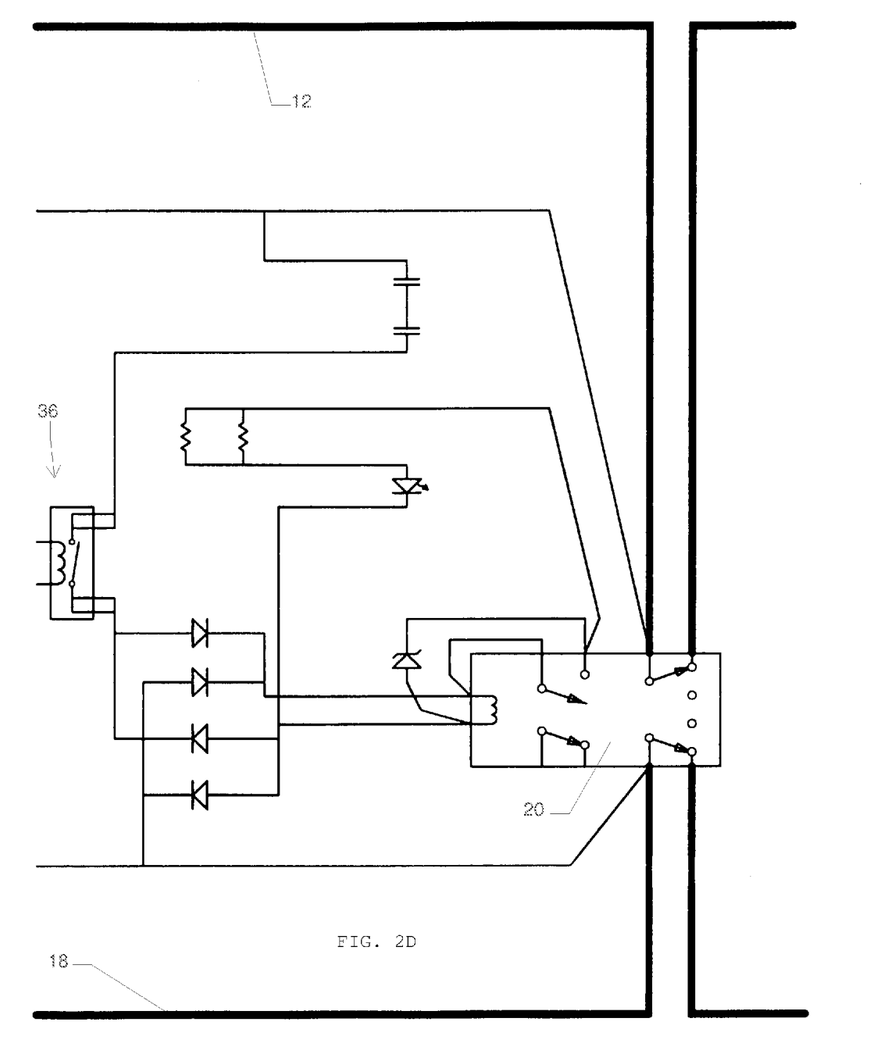
FIG. 2D illustrates a third partial close-up schematic of the power disconnect circuit of FIG. 2A.
Figure 3:
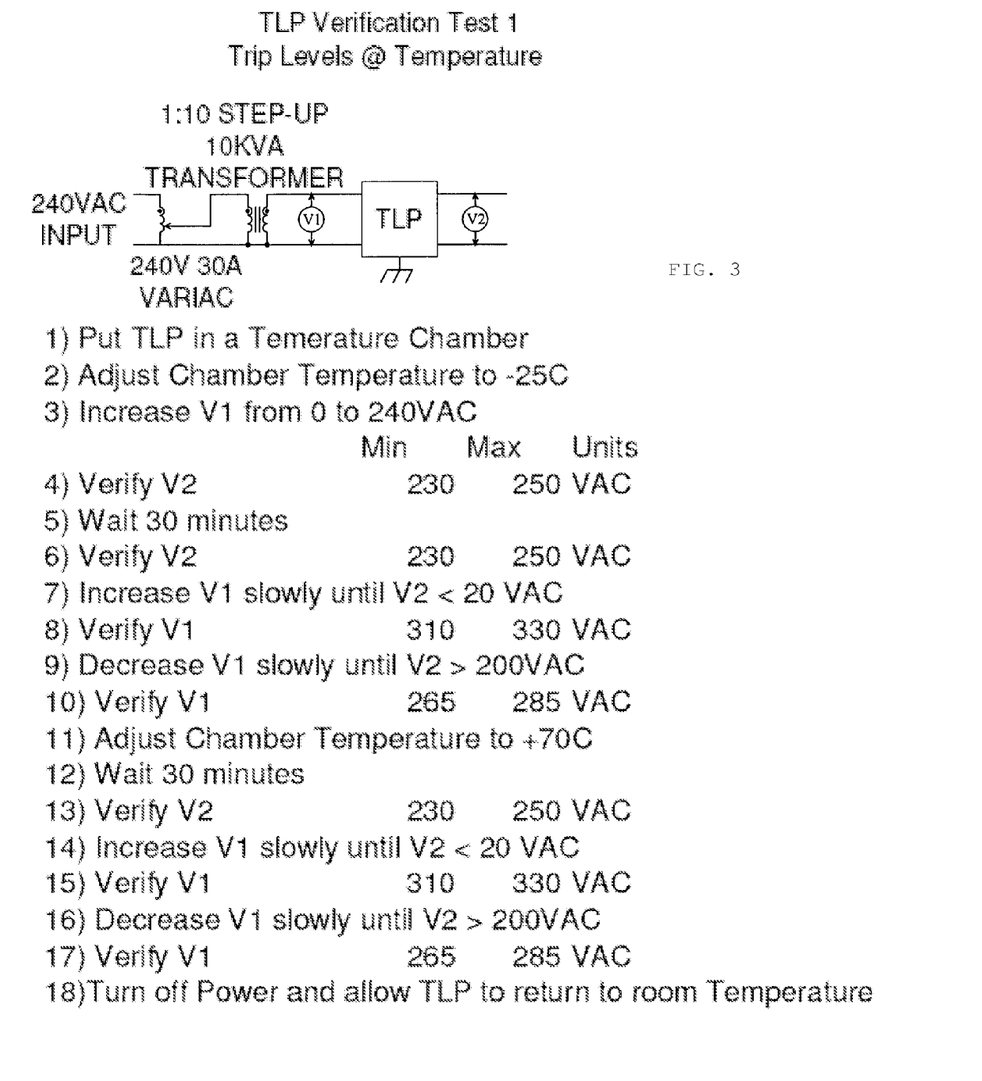
FIG. 3 illustrates a first test setup, procedure, and results utilizing certain aspects of the present inventions.
Figure 4:
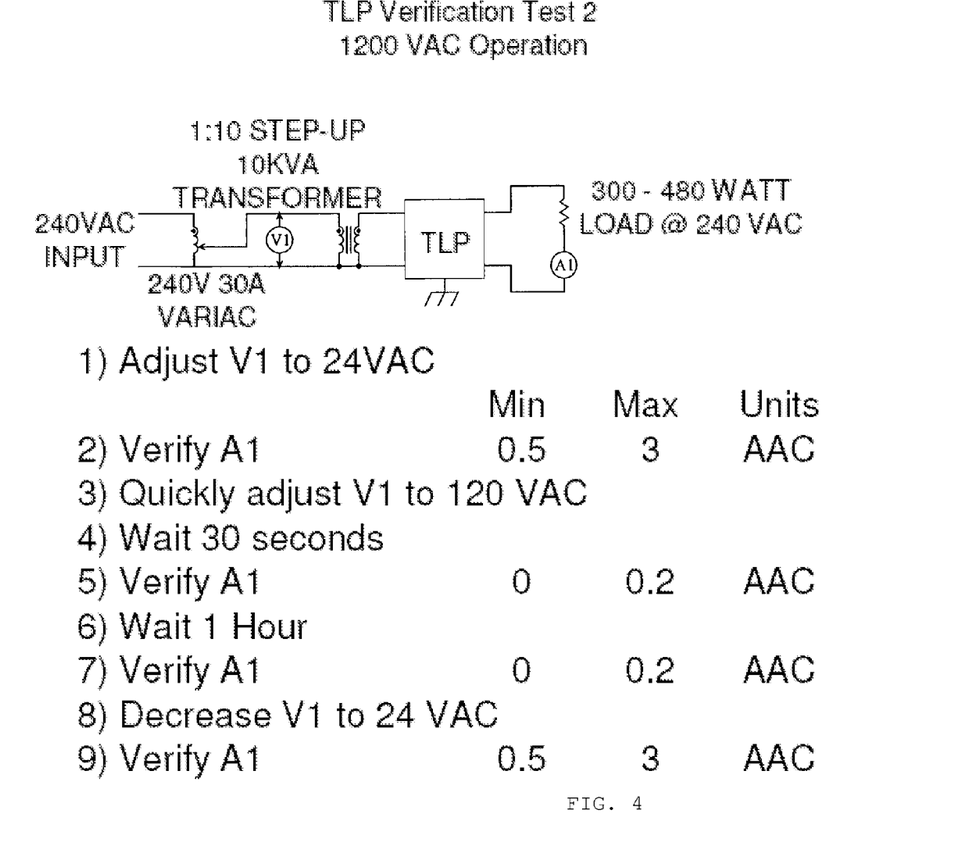
FIG. 4 illustrates a second test setup, procedure, and results utilizing certain aspects of the present inventions.
Figure 5:
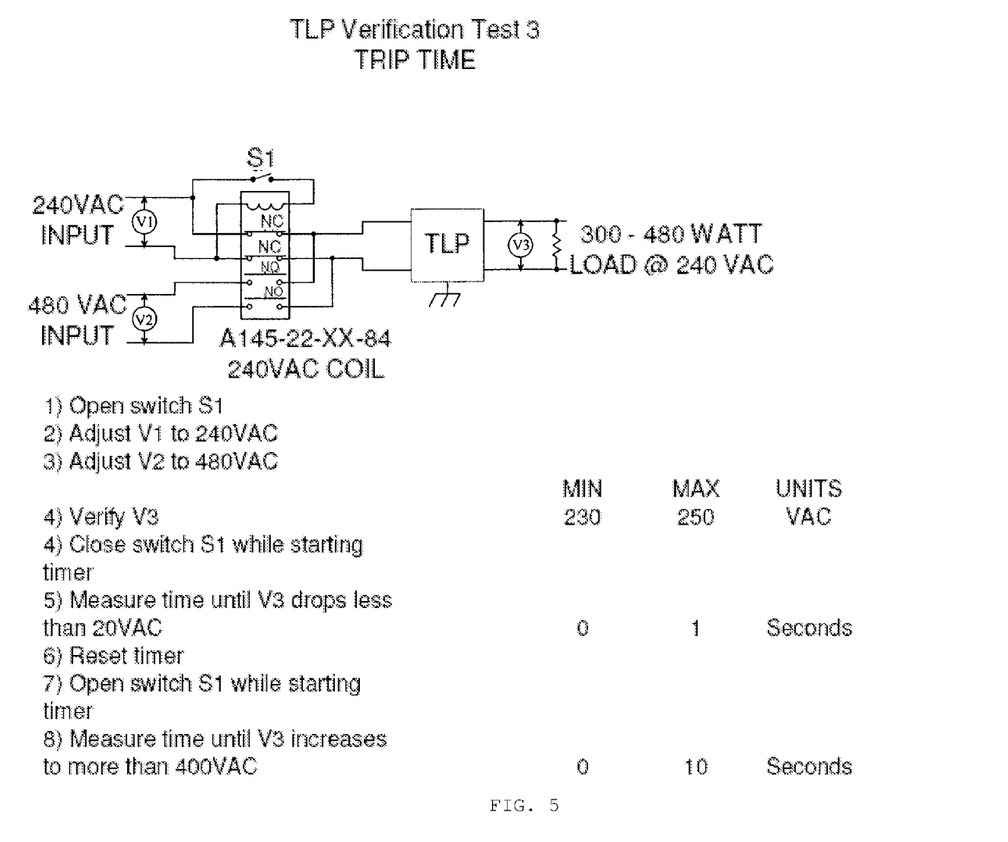
FIG. 5 illustrates a third test setup, procedure, and results utilizing certain aspects of the present inventions.
Figure 6:
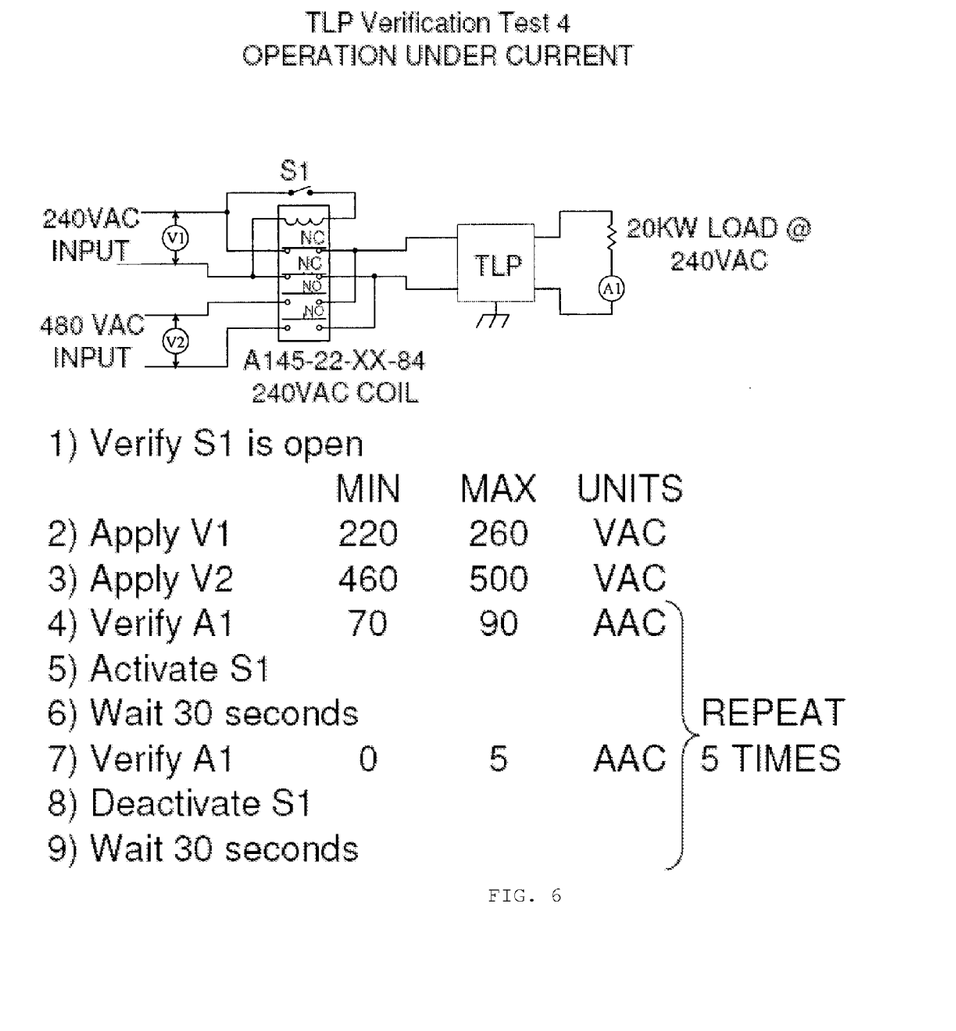
FIG. 6 illustrates a fourth test setup, procedure, and results utilizing certain aspects of the present inventions.
Figure 7:
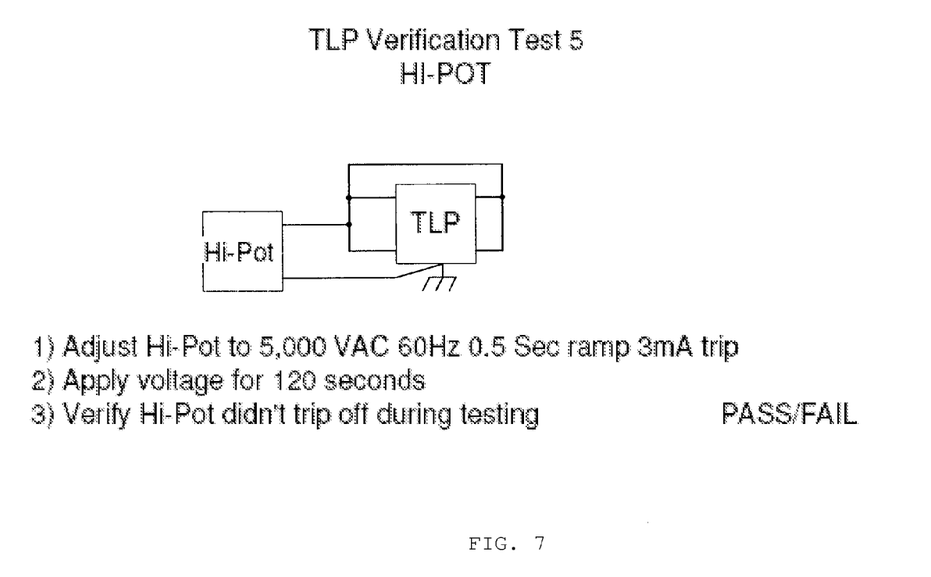
FIG. 7 illustrates a fifth test setup, procedure, and results utilizing certain aspects of the present inventions.

In any case, as shown in FIG. 2B, the circuit 16 may include an internal power supply section 22, or may use an external power supply. The circuit 16 may also include a voltage sense portion 24 to monitor the line voltage(s). The circuit 16 may also include a disconnect level resistor 26, or some other mechanism to assist in detecting the fault. The circuit 16 may also include a voltage hysteresis portion 28 that assists in detecting the fault and/or detecting when the fault has cleared. This voltage hysteresis portion 28, and/or other components of the circuit 16, may define the disconnect level, reconnect level, disconnect period, and/or reconnect period, each of which will be discussed in more detail below. The detection circuit 16 may also include a current source portion 30, a relay control portion 32, and/or a control relay power source portion 34, as shown in FIG. 2C. The switch 20 may be triggered by a relay 36 incorporated in the circuit 16, as shown in FIG. 2D.

As discussed above, the line 12 could be a residential service line of 110 VAC, 115 VAC, 120 VAC, 220 VAC, 230 VAC, 240 VAC, 208 VAC, 277 VAC, 380 VAC, 415 VAC, 480 VAC, 600 VAC, or any other voltage commonly used for residential service. The line 12 could alternatively be a utility power distribution line of 2400 VAC, 3300 VAC, 4160 VAC, 7200 VAC, 7620 VAC, 11 k VAC, 12470 VAC, 13200 VAC, 14400 VAC, 19920 VAC, 22 k VAC, 22860 VAC, 24940 VAC, 33 k VAC, 34500 VAC, or any other voltage commonly used for power distribution.

The fault is preferably detected in less than five seconds. In a preferred embodiment, the fault is detected in less than one second. In another preferred embodiment, the fault is detected in less than one-half second. In a specific embodiment, the fault is detected in approximately 340 milliseconds. In any case, the detection circuit 16 may immediately trigger the switch 20, upon detecting the fault. Thus, the load 14 is preferably disconnected from the line 12 in less than five seconds from detection of the fault. In a preferred embodiment, the load 14 is preferably disconnected from the line 12 in less than one second from detection of the fault. In another preferred embodiment, the load 14 is preferably disconnected from the line 12 in less than one-half second from detection of the fault. In a specific embodiment, the load 14 is disconnected from the line 12 in approximately 340 milliseconds from detection of the fault. Of course, as will be discussed in more detail below, the fault may actually be detected before the load 14 is disconnected from the line 12. For example, where the load 14 is disconnected from the line 12 in approximately 340 milliseconds, the fault may actually be detected in less than 340 milliseconds, such as approximately 300 milliseconds, approximately 200 milliseconds, or approximately 100 milliseconds.

The detection circuit 16 preferably monitors the line 12 before, during, and after the fault. For example, the detection circuit 16 may monitor the line 12 for a line voltage, a line current, and/or a line phase, and declare the fault upon any one of these being out of normal range. The detection circuit 16 may also monitor an external input, such as an access sensor, a smoke sensor, and/or a heat sensor, and declare the fault upon receiving or losing any one of these inputs. Such sensors may be used as an interlock, alternative, and/or backup sub-system. The detection circuit 16 may also declare a fault upon any combination of line conditions and/or external inputs.

More specifically, in one embodiment, the detection circuit 16 may monitor the line voltage of the line 12 and the fault may be detected at the disconnect level, when the line voltage exceeds between 120% and 200%, such as approximately 125% or approximately 130%, of the normal voltage. For example, in a specific embodiment, the detection circuit 16 may monitor the line voltage of the line 12, wherein the line voltage is normally approximately 240 VAC, and the fault may be detected at the disconnect level, when the line voltage reaches approximately 300 VAC. Such a system 10 may be capable of withstanding approximately a line voltage of approximately 1200 VAC for at least one hour. The system 10 may normally be exposed to the line voltage at up to approximately, 100 AAC, 200 AAC, or even up to approximately 500 AAC. Of course, other line voltages, fault ranges, and/or disconnect levels may be used, as discussed above.

The load 14 may be automatically reconnected to the line 12 at the reconnect level, when the line voltage drops to within 5% or 10% of the normal line voltage. For example, where the system 10 is designed with a normal line voltage of 240 VAC, the load 14 may be automatically reconnected to the line 12 at the reconnect level, when the line voltage drops back down to approximately 250 VAC after having been disconnected due to the fault. The system 10 may reconnect the load 14 to the line 12 immediately after the fault has cleared or may wait some reconnect period to ensure the fault has cleared. For example, the system 10 may wait between one second and 10 minutes, such as 1 second, 10 seconds, 30 seconds, 1 minute, or 5 minutes, after the fault has cleared and has remained cleared before reconnecting the load 14 to the line 12 to ensure that the fault has truly cleared. Alternatively, rather than using a predetermined reconnect period the system 10 may use a variable reconnect period that depends on the severity of the fault, when reconnecting the load 14 to the line 12. For example, the system 10 may use a longer reconnect period for a more severe fault, as opposed to a shorter reconnect period for a less severe fault.

Similarly, the system 10 may react quicker to a more severe fault when disconnecting the load 14 from the line 12. For example, the system 10 may be designed to wait a short delay disconnect period after detecting the fault before disconnecting the load 14 from the line 12. Thus, the system 10 may use a shorter delay period for a more severe fault, as opposed to a longer delay period for a less severe fault.

Alternatively and/or additionally, in some embodiments, the system 10 of the present invention may essentially piggyback a more traditional surge suppression system, a uninterruptible power supply (UPS) system, and/or some other power quality or protection system, such as a more traditional breaker system. Traditional surge suppressors are typically designed to handle quick, short duration, high energy surges, but commonly lack the ability to handle a sustained surge, possibly depending upon the severity of the over-voltage. Similarly, traditional UPSs can only sustain the load for so long, possibly depending upon the severity of the over-voltage, under-voltage, and/or phase loss. Finally, traditional breaker systems may be bridged by excessive over-voltages. Therefore, the system 10 of the present invention may wait until it is clear that any fault is at or beyond the capability of the piggy-backed system, before disconnecting the load 14 from the line 12. More specifically, the system 10 of the present invention may analyze the fault for severity, such as over-voltage, under-voltage, and/or phase loss, and disconnect the load 14 from the line 12 at a time, and/or in a manner, dependant upon that severity.

FIG. 3, FIG. 4, FIG. 5, FIG. 6, FIG. 7, show various testing setups, procedures, and results that may be used with and/or expected from the system 10 of the present invention.

Figure 8:
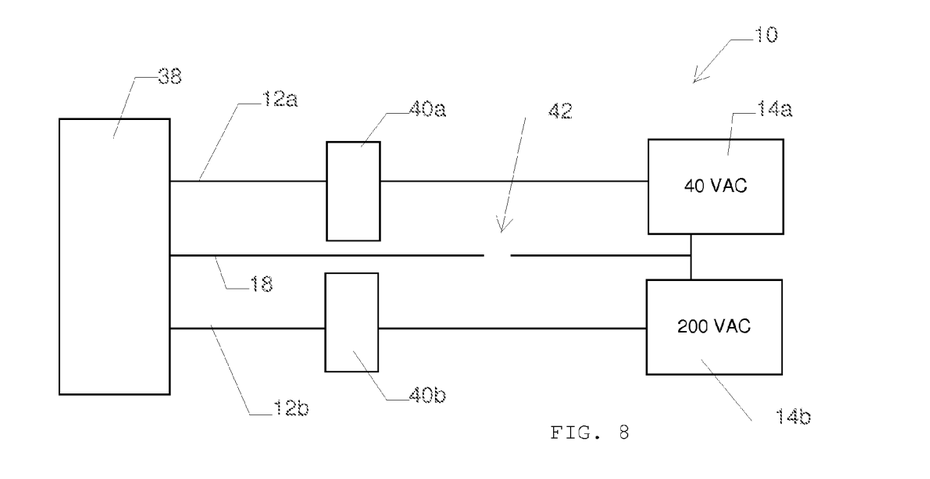
FIG. 8 illustrates a prior art system.

FIG. 8 shows a typical prior art residential power system 10 where a transformer or other source 38 converts distribution line voltages to residential line voltages, which is supplied to various loads 14,14a,14b within a house through one or more breakers 40a,40b. As discussed above, the distribution line voltages may be, for example, 2400 VAC, 3300 VAC, 4160 VAC, 7200 VAC, 7620 VAC, 11 k VAC, 12470 VAC, 13200 VAC, 14400 VAC, 19920 VAC, 22 k VAC, 22860 VAC, 24940 VAC, 33 k VAC, 34500 VAC, or any other voltage commonly used for power distribution. As also discussed above, the residential line voltages may be, for example, 110 VAC, 115 VAC, 120 VAC, 220 VAC, 230 VAC, 240 VAC, 208 VAC, 277 VAC, 380 VAC, 415 VAC, 480 VAC, 600 VAC, or any other voltage commonly used for residential service. More specifically, in a typical residential installation, the residential power service comprises two hot lines 12a,12b and a neutral line 18. The line voltage between the hot lines 12a,12b is typically 240 VAC, with the line voltage between either hot line 12a, 12b to the neutral 18 is typically 120 VAC. In this case, many of the load(s) 14,14a,14b are wired between the lines 12a,12b and the neutral 18, and therefore expect to see approximately 120 VAC.

However, when the neutral 18 experiences a break, open, or other fault, 42 the load(s) 14,14a,14b may experience more than 120 VAC. More specifically, where the neutral 18 has experienced an open 42, the load(s) 14,14a,14b may experience anywhere between 0 and 240 VAC. In the example shown, one of the loads 14a experience approximately 40 VAC and another load 14b experiences approximately 200 VAC. Both conditions are potentially damaging to the loads 14,14a,14b likely to result in malfunctions and/or cause other problems.

Figure 9:
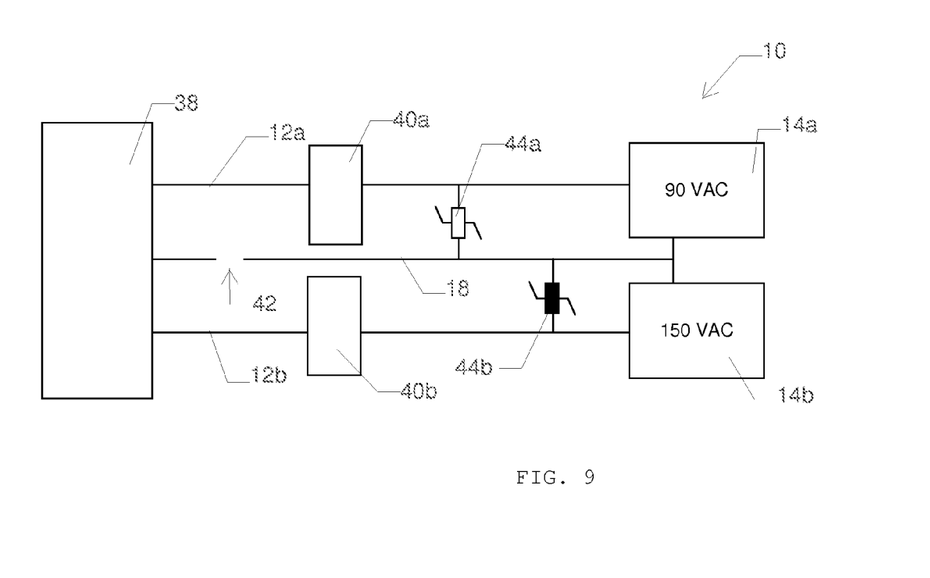
FIG. 9 illustrates the prior art system of FIG. 8 using transient voltage surge suppressors (TVSS)

If the residential service employs Transient Voltage Surge Suppressors (TVSS) 44a,44b as shown in FIG. 9, appliances will be protected as long as the TVSS 44a,44b is able to handle the open-neutral failure. However, in an exemplary case of an open-neutral 42, one of the TVSS 44b may be subjected to an extreme power overload and may fail in a short amount of time.

Figure 10:
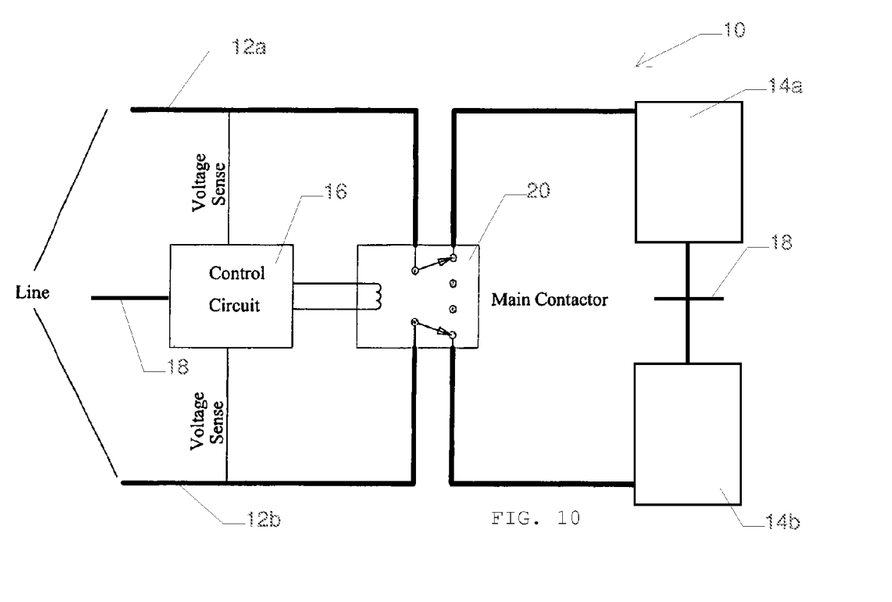
FIG. 10 illustrates another particular embodiment of a power disconnect system utilizing certain aspects of the present inventions.
Figure 11:
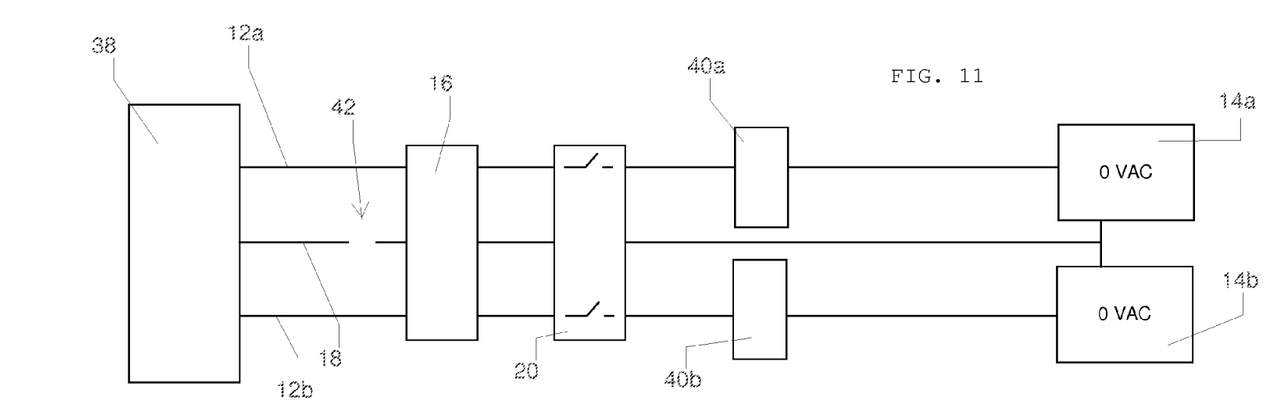
FIG. 11 illustrates still another particular embodiment of a power disconnect system utilizing certain aspects of the present inventions.
Figure 12:
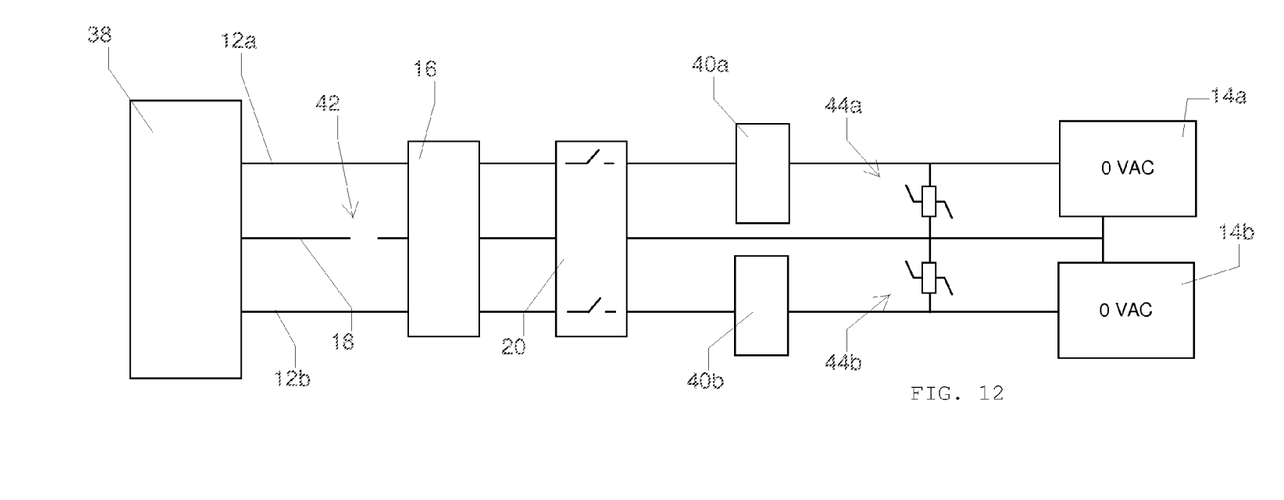
FIG. 12 illustrates the embodiment of FIG. 11 using TVSS.

Therefore, as shown in FIG. 10, 11, and/or 12, the detection circuit 16 of the present invention may monitor both hot lines 12a,12b and/or neutral 18 and trigger the switch 20 to disconnect the load(s) 14,14a,14b from the hot lines 12a,12b when a fault 42 is detected. More specifically, when the detection circuit 16 detects any of the faults discussed above and/or an open neutral, the detection circuit 16 may trigger the switch 20 to disconnect the load(s) 14,14a,14b from the lines 12a,12b. In this case, all devices connected to each 120 VAC circuit are protected. As shown in FIG. 12, a system with TVSS 44a,44b may likewise be protected against an open-neutral failure 42.

Figure 13:
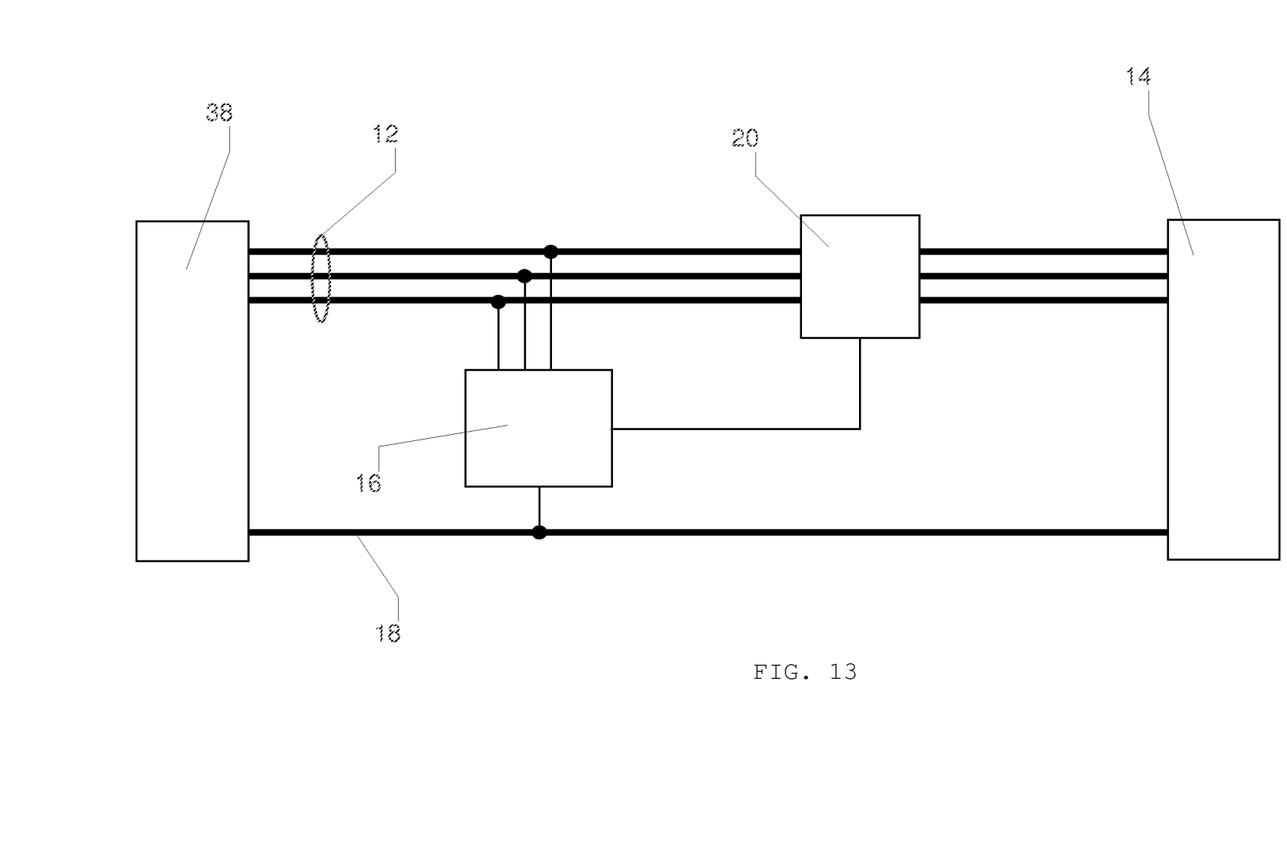
FIG. 13 illustrates still another particular embodiment of a power disconnect system utilizing certain aspects of the present inventions.

FIG. 13 depicts a 3-phase wye system 10. Such a system 10 may incorporate a 120/208 system which has 120 VAC between each line and neutral and 208 VAC between each line and any other line. Another common voltage for this configuration is 277/480. In these cases, the 3-phase loads such as motors may be protected from over-voltage, under-voltage, and phase-loss. In these cases, single phase loads are protected from over-voltage, under-voltage, and the dreaded open-neutral failure. Although not shown, the system 10 of the present invention, or select features thereof, might also be used in a delta configuration.

In one embodiment, the detection circuit 16 monitors the line voltages between each line 12 and the neutral 18 and triggers the switch 20 when it detects an open neutral, an over-voltage, an under-voltage, a phase loss, and/or receives an external trigger. An open neutral fault 42 may be described as where there is a discontinuity, break, or open circuit between the neutral 18 from an incoming power line, or source such as the transformer 38, and the internal residential wiring. This may occur anywhere between the transformer 38 and any of the loads 14a,14b.

An open neutral fault 42 will often, but not necessarily always, result in a difference in line voltages between first and second hot lines 12a,12b, with respect to the neutral 18. In a typical, properly operating system, the line voltage between the first and second lines 12a,12b and the neutral 18 is expected to be equal but opposite. Many factors may contribute to those line voltages not being exactly equal. However, in some embodiments, an open neutral 42 may be assumed to be the cause of significant differences in the line voltages.

In some embodiments, an open neutral 42 may be assumed where there is a 5 volt difference between a first line voltage, as measured between the first line 12a and the neutral 18, and a second line voltage, as measured between the second line 12b and the neutral 18. In other embodiments, the detection level or difference may be 10 volts, 15 volts, 20 volts, 25 volts, 30 volts, or more. Alternatively, that difference may be expressed in terms of a percentage, such as 5%, 10%, 15%, 20%, 25%, or more. In any case, in some embodiments, when an open neutral fault is detected, the switch may be triggered to disconnect the load from the lines.

As discussed above, the detection circuit 16 may automatically cause the switch 20 to reconnect the load(s) 14,14a,14b to the first and second lines 12a,12b once the fault has cleared. In some cases the point at which the load(s) 14,14a,14b are reconnected to the lines 12a,12b may be different than the point at which the load(s) 14,14a,14b are disconnected from the lines. For example, in one embodiment, the load(s) 14,14a,14b may be disconnected from the lines 12a,12b at the disconnect level, when a 10% difference in the line voltages is detected, and the load(s) 14,14a,14b may be reconnected to the lines 12a,12b at the reconnect level, when a 5% difference in the line voltages is detected. While not the preferred embodiment, the disconnect reconnect periods may also be used with an open neutral fault 42.

However, it is understood that open neutral faults 42 may not clear on their own, without maintenance, repair, or other service. Therefore, in some embodiments, to prevent further damage to the load(s) 14,14a,14b and/or the system 10, the load(s) 14,14a,14b might only be reconnected to the lines 12a,12b manually.

Other and further embodiments utilizing one or more aspects of the inventions described above can be devised without departing from the spirit of Applicant's invention. For example, as discussed above, any feature and/or embodiment of the system of the present invention can be modified for and used with three phase loads and/or motors. For example, rather than detecting a difference in the line voltages, the detection circuit may detect the presence or absence of current flow, or changes in current flow. More specifically, in order to trigger the switch, the detection circuit may detect a shift of current flow from the neutral to one of the lines and/or some other interruption of current flow on the neutral.

In the case of motor, the detection circuit may additionally, or alternatively, detect a phase fault condition. When a phase fault is detected on the line, the system may immediately disconnect the load, or motor, from the line, continue to monitor the phase of the line, and reconnect the load to the line when the phase fault has cleared.

Additionally, the system of the present invention could be designed for and used with direct current applications. Additionally, rather than merely disconnect the load(s) from the line(s), the system of the present invention may connect the load(s) to a redundant, alternative, or back-up power source. Further, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A system for protecting a load from a fault related to a plurality of lines, the system comprising:

a detection circuit monitoring a first line and a second line, the detection circuit comprising a voltage hysteresis portion; and a switch interposed between the first and second lines and the load;

wherein the detection circuit triggers the switch to disconnect the load from the first and second lines when the fault is detected and wherein the voltage hysteresis portion of the detection circuit defines a disconnect level, reconnect level, disconnect period, and reconnect period, wherein the voltage hysteresis portion of the detection circuit allows the switch to reconnect the load to the first and second lines after a predefined period of time, and wherein the voltage hysteresis portion of the detection circuit is configured to select the reconnect period based on a severity of the fault.

2. The system of claim 1, wherein the detection circuit triggers the switch within one second of detecting the fault.

3. The system of claim 1, wherein the detection circuit monitors a line voltage of the first and second lines, wherein the line voltage is normally approximately 240volts AC and the fault is detected when the line voltage reaches approximately 300 volts AC.

4. The system of claim 1, wherein the detection circuit monitors a line voltage of the first and second lines and the fault is detected when the line voltage exceeds a predefined percentage of a normal voltage.

5. The system of claim 1, wherein the system is capable of withstanding approximately 1200 volts AC for at least one hour.

6. The system of claim 1, wherein the system is normally exposed to approximately 240 volts AC at up to approximately 200 amps AC.

7. The system of claim 1, wherein the system is normally exposed to approximately 480 volts AC at up to approximately 500 amps AC.

8. The system of claim 1, wherein the detection circuit monitors a line voltage of the first and second lines, wherein the line voltage is normally approximately 240volts AC and the load is automatically reconnected to the line when the line voltage drops to approximately 250 volts AC.

9. The system of claim 1, wherein the detection circuit monitors a line voltage of the first and second lines and the load is automatically reconnected to the line when the line voltage drops to within a predefined percentage of a normal voltage.

10. The system of claim 1, wherein the fault is a condition selected from the group consisting of an open neutral, an over-voltage, an under-voltage, a phase loss, and an external trigger.

11. The system of claim 1, wherein the detection circuit monitors the first and second lines for an open neutral condition, an over-voltage condition, an under-voltage condition, and a phase loss condition, and the fault is detected as any one or more these conditions.

12. The system of claim 1 wherein the predefined period of time comprises a predetermined period of time.

13. The system of claim 1 wherein the predefined period of time comprises a variable period of time.

14. A system for protecting a load from a fault related to a plurality of lines, the system comprising:

at least one detection circuit comprising a voltage hysteresis portion, the detection circuit collectively monitoring a first line voltage between a first line and a neutral, and a second line voltage between a second line and the neutral; and a switch interposed between the first and second lines and the load;

wherein the at least one detection circuit triggers the switch to disconnect the load from the first and second lines when the fault is detected, and wherein the voltage hysteresis portion of the at least one detection circuit defines a disconnect level, reconnect level, disconnect period, and reconnect period, wherein the voltage hysteresis portion of the at least one detection circuit allows the switch to reconnect the load to the first and second lines after a predefined period of time once the fault has cleared, and wherein the voltage hysteresis portion of the at least one detection circuit is configured to select the reconnect period based on a severity of the fault.

15. The system of claim 14, wherein the fault is a condition selected from the group consisting of an open neutral, an over-voltage, an under-voltage, a phase loss, and an external trigger.

16. The system of claim 14, wherein the detection circuit monitors the first and second line voltages for an open neutral condition, an over-voltage condition, an under-voltage condition, and a phase loss condition, and the fault is detected as any one or more these conditions.

17. The system of claim 14, wherein the detection circuit triggers the switch when it senses a difference in the first and second line voltages.

18. A system for protecting a load from a fault related to a one or more lines, the system comprising:

at least one detection circuit comprising a voltage hysteresis portion, the at least one detection circuit monitoring a first line voltage between a first line and a neutral; and a switch interposed between the first line and the load;

wherein the at least one detection circuit triggers the switch to disconnect the load from the first line when the fault is detected, and wherein the voltage hysteresis portion of the at least one detection circuit defines a disconnect level, reconnect level, disconnect period, and reconnect period, wherein the voltage hysteresis portion of the at least one detection circuit allows the switch to reconnect the load to the first line, and wherein the voltage hysteresis portion of the at least one detection circuit is configured to select the reconnect period based on a severity of the fault.

19. The system of claim 18, wherein the detection circuit also monitors a second line voltage between a second line and the neutral, the switch is also interposed between the second line and the load, and the detection circuit triggers the switch to disconnect the load from the second line when the fault is detected and automatically causes the switch to reconnect the load to the second line once the fault has cleared.

20. The system of claim 19, wherein the detection circuit triggers the switch to disconnect the load from the first and second lines when it senses a difference in the first and second line voltages.

* * * * *